Jan. 12, 1954     G. P. BOSOMWORTH ET AL     2,665,467
FASTENING DEVICE
Filed Sept. 5, 1951                                          2 Sheets-Sheet 1
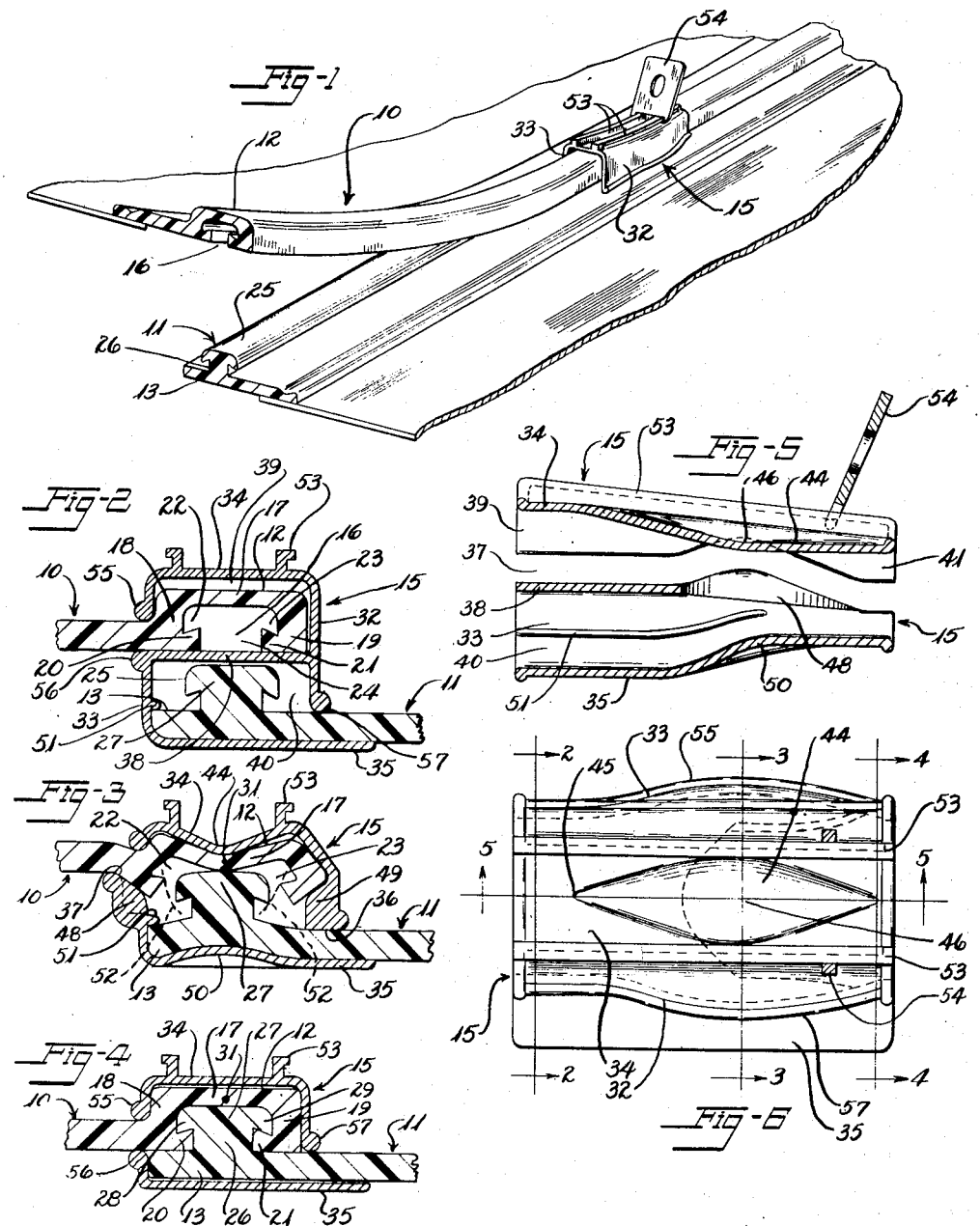
Inventors
George P. Bosomworth
Stanley M. Clark
By Ely & Frye
Attys Jan. 12, 1954   G. P. BOSOMWORTH ET AL   2,665,467
FASTENING DEVICE Filed Sept. 5, 1951   2 Sheets-Sheet 2

Inventors
George P. Bosomworth
Stanley M. Clark
By Ely & Frye
Attys-

Patented Jan. 12, 1954

2,665,467

UNITED STATES PATENT OFFICE 2,665,467

FASTENING DEVICE

George P. Bosomworth, Akron, and Stanley M. Clark, Parma, Ohio, assignors to The Firestone Tire & Rubber Company, Akron, Ohio, a corporation of Ohio Application September 5, 1951, Serial No. 245,133

12 Claims. (Cl. 24—201)

This invention relates to fastening devices and more particularly to slide fasteners having continuous longitudinal interlocking male and female portions.

In general, slide fasteners of the type to which the present invention is directed comprise two separable strips having a continuous rib in one strip adapted to be brought in interlocking engagement with a continuous groove in the other strip by means of a suitable slide member. Various fasteners of this type have been designed in the past, but these have fallen short of success for a number of reasons. Many of them do not have the mechanical strength sufficient to hold the strips together. Others have a design which requires the slide member to enter fully within the groove of the fastener, and, as a result, objectionably high friction is encountered in the operation of such fasteners. In many cases the design requires relatively large clearances between the parts with the result that the fasteners cannot be used when the service demands the fastener to be impervious to liquids and gases.

A general object of the invention, therefore, is to provide a fastener of the continuous type which avoids these disadvantages of the prior art.

Another object is to provide a continuous fastener having interlocking undercut portions which give high mechanical strength to the fastener and which provide a tight seal against the passage of liquids and gases.

Another object is to provide a fastener having dependable and unique means for bringing the parts into and out of interlocking engagement.

Another object is to provide a fastener which can be readily extruded from rubber, plastic, or like materials.

Another object is to provide a zipper which is dependable in operation, having freedom from jamming or binding.

Other objects are to provide a fastener which is economical to manufacture and which is neat and attractive in appearance.

Figure 7:
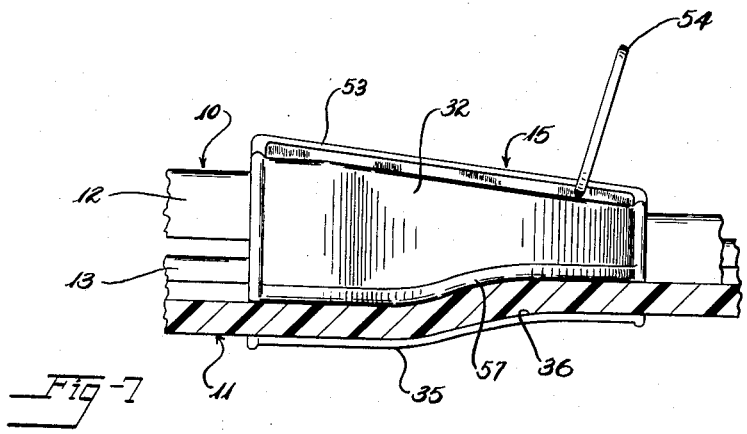
Figure 8:
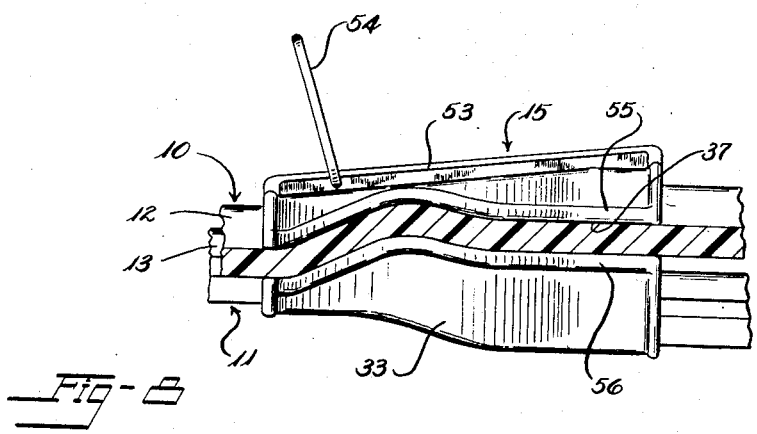

These and other objects and advantages will be apparent from the following description of a preferred form of the invention in which:

Figure 1 is a perspective view of a continuous fastener embodying the invention, showing a slide member being operated in a manner to open the fastener, Figure 2 is a section of the slide and the fastener elements taken in the plane indicated by the lines 2—2 of Figure 6, showing the relation of the slide member and the fastener elements just before the elements are brought into interlocking engagement, Figure 3 is a sectional view similar to Figure 2 but taken in the plane indicated by the lines 3—3 of Figure 6, showing the fastener elements as they are brought into interlocking engagement, Figure 4 is a sectional view similar to Figures 2 and 3 but taken in the plane indicated by the lines 4—4 of Figure 6 and showing the fastener elements in interlocking engagement just before they leave the slide member, Figure 5 is a longitudinal sectional view of the slide member taken in the plane indicated by the lines 5—5 of Figure 6, Figure 6 is a top plan view of the slide with the fastener elements omitted to show its construction more clearly, Figure 7 is a side elevation of the slide member and fastener elements showing the elements entering the slid from the left and emerging from the right of the slide, and Figure 8 is a side elevation similar to Figure 7 showing the other side of the slide member.

The preferred form of the invention as shown in Figure 1 comprises a pair of strip elements 10 and 11 having female and male portions 12 and 13, respectively, which are adapted to have interlocking engagement to hold the parts firmly together against lateral stresses. The strips are brought into interlocking engagement by the operation of a slide member 15 which is moved longitudinally along the interlocking portions of the strips.

The female portion of the strip 10 takes the form of a thickened portion extending longitudinally along the edge of the strip and having a longitudinal groove or recess 16. The groove has a plane of symmetry extending at right angles to the plane of the strip and is defined by a top wall 17 and by the downwardly extending walls 18 and 19. The walls 18 and 19 terminate in the laterally extending undercut lip portions 20 and 21, respectively, so that the groove in lateral section has a T-shaped appearance, with the undercut channels 22 and 23 forming the bar of the T and the recess portion 24 forming the stem of the T.

The male portion 13 of the fastener comprises a longitudinally extending continuous rib 25 having a T-shaped cross section as shown which is adapted to fit snugly within the groove 16. Thus the rib 25 has a stem portion 26 extending upwardly from and at right angles to the strip 11 and terminating in a head 27 having the overhanging projecting shoulders 28 and 29, respectively.

It wil be observed, particularly from Figure 2, that the groove portion indicated at 24, which lies between the parts 20 and 21, in its normal state is too narrow to permit entrance of the head 27 of the rib, but that in the final interlocked position of the parts, as shown in Figure 4, the rib has entered fully into the recess with the head 27 extending beyond the recess portion 24 and with the shoulders 28 and 29 fitting snugly within the channels 22 and 23. A particular feature of the invention resides in the manner in which the groove is opened up and the parts brought into interlocking position by the slide member 15.

The slide member 15 brings about this interlocking engagement by bending the female portion 12 of the strip 10 about the longitudinal axis of symmetry indicated at 31 so that it takes a concave shape, see Figure 3. As this bending is induced by the slide member, the walls 18 and 19 move away from each other and the groove 16 opens up to permit entrance of the rib 25. Thereafter the walls 18 and 19 rotate downwardly and inwardly, following the paths indicated by the dotted lines of Figure 3, to close around and under the projecting shoulders 28 and 29 of the rib 25.

The slide member 15 is of a generally tubular construction, rectangular in section, having side walls 32 and 33, a top wall 34, and a bottom wall 35. The top and bottom walls converge to each other from a maximum opening at the entrance end, shown at the left of Figure 1, to a minimum opening at the exit end at the right of Figure 1. The side wall 32 has a longitudinal slotted opening 36 extending the full length of the slide through which the web of the strip 11 extends and the side wall 33 has a similar longitudinal slotted opening 37 through which the web of the strip 10 extends. In order to hold the slide member together as an integral unit, a central partition 38 which lies generally parallel to the top and bottom walls is provided. The partition connects with the side wall 32 above the slotted opening 36 and connects with the side wall 33 below the slotted opening 37. The partition extends from the entrance end of the slide inwardly for a distance of about half the length of the slide thus dividing the slide into the upper and lower passages 39 and 40 at the entrance end of the slide which merge into the single passage 41 at the exit end of the slide.

To induce the bending of the recessed portion 12, in the manner referred to above, the top wall 34 of the slide member is provided with a longitudinally extending inward projection 44 which acts progressively to bend the recessed portion 12 about the axis 31. The projection 44 begins near the entrance end of the slide at about the point indicated at 45, reaches a maximum at the point 46, and then diminishes gradually from that point to the exit end of the slide. Maximum bending of the female portion 12 about the axis is illustrated in Figure 3 where the projection 44 is shown as bending the top wall downwardly to assume a concave shape, causing the walls 18 and 19 to move outwardly and upwardly. To ensure this movement of the side walls 18 and 19, the slide member is provided with a pair of longitudinally extending cams 48 and 49 which project from the walls 32 and 33 beginning at about the point where the partition 38 terminates and extending to the exit end of the slide, see Figure 5. The cams lift the walls 18 and 19 upwardly by progressively increasing amounts until point 46, the position of maximum bending, is reached, see Figures 3 and 5. From this point on, the cams 48 and 49 diminish and permit the walls 18 and 19 to rotate downwardly to the position shown in Figure 4.

In order to provide room for the walls 18 and 19 of the recess to open outwardly, the side walls 32 and 33 of the slide member bulge outwardly as shown in Figure 6 and then converge inwardly toward the exit end. The converging side walls of the slide member act as cams to aid in the interlocking of the fastener parts.

The rib 25 is introduced into the opened groove 16 by a longitudinal, upwardly projecting dimple 50 in the bottom wall 35 of the slide member. The dimple as shown in Figure 3, acts to bend the male strip 11 convexly upwardly to lift the rib 25 and force it into the groove. A guide rail or flange 51 is provided on wall 33 of the slide member opposite the slot 37 in order to hold the edge of the male strip 11 in the proper position. The flange 51 extends from the entrance end of the slide to about point 46, the point of maximum bending. It will be noted that this bending of the ribbed portion of the fastener tends to open up the longitudinal grooves indicated at 52, thus facilitating the movement of the lips 20 and 21 into and out of the grooves.

The slide member is grasped and operated by means of a bail 54 which is slidably supported by a pair of rails 53 which form an integral part of the top of the slide member. To enable the slide member 15 to move easily along the fastener strips, the edges of the slide member which have sliding contact with the strips are provided with the enlarged, rounded beads indicated at 55, 56, and 57 in Figures 2–4.

In operation, the female recessed portion 12 of the strip 10 is inserted into the upper passage 39 of the slide member and the male portion 13 of the strip 11 is inserted into the lower passage 40. When the slide member 15 is drawn forwardly, as viewed in Figure 1, the projection 44 in the upper wall will bear against the female portion 12 and cause the top wall 17 to bend downwardly while at the same time the cams 48 and 49 move the walls 18 and 19 outwardly and relatively upwardly, causing the groove 16 to open wide to receive the male rib 25, which at the same time is forced upwardly by the dimple 50. Thereafter the converging walls of the slide member cause the grooved portion to close inwardly about the male rib in the manner already described, and the interlocked fastener parts emerge from the exit end of the slide member.

The fastener can be unlocked and the strips separated by pulling the slide member in the opposite direction. In the unlocking process the partition 38 serves to separate the two strips by forcing them apart shortly after the position of Figure 3 is reached.

When the fastener parts are locked together, they will effectively resist all the forces tending to pull the fastener apart which are encountered in normal service. The fastener is equally strong against pulls in any direction for there is no plane or direction of weakness. It should be noted that the shoulders 28 and 29 of the rib are undercut by an appreciable amount, and that the lips 20 and 21 are undercut by the same amount to provide a stronger, more secure interlocking of the parts. The manner in which the parts are engaged permits the parts to fit with small clearances, thus providing a fluid-proof fastener.

The materials from which the fastener is made are usually a matter of choice. In larger sizes the fastener can be made of rubber, such as hard tube stock material for use in service which demands that the fastener be water and fluid tight, such as in survival suits for navy personnel. In such an embodiment of the invention, it may be desirable to stiffen the male ribs with longitudinally extending, flexible wire inserts positioned in the fastener elements. When rubber, either natural or synthetic, is used, it is preferably compounded to have a low coefficient of friction; for example, wax may be compounded with the rubber. If rubber is used, economical manufacture is possible by means of continuous extrusion of the parts according to known practice combined with a continuous vulcanization of the extruded sections by means of a high frequency field. Such manufacturing technique is well known in the art and forms no part of this invention. In the smaller sizes the fastener may be made from any suitable plastic material, such as nylon, poly-vinyl chloride, vinyl-chloride-vinylidene chloride copolymer, vinyl-chloride-vinyl-acetate copolymer, polyethylene, vinyl-chloride-acrylonitrile copolymer, and the like. In some cases, the strips might be of metal, such as brass, bronze, and the like extruded or rolled to the desired section.

The slide member 15 because of its complex structure is preferably die cast from a suitable metal alloy, although in some cases it may comprise a brazed assembly of stamped parts.

While a preferred form of the invention has been described, various modifications and changes will occur to those skilled in the art without departing from the spiirt and scope of the invention. For example, the bending of the grooved or recessed strip may be accomplished by the imposition of a set of forces different from that described, such as a pair of equal opposed colinear forces applied along the web or top wall 17 of the groove which would cause the web to collapse inwardly and open up the groove. Again, the interlocking rib and groove has been described as symmetrical, but it will be obvious that asymmetrical parts can function in a manner according to the invention. Likewise, the rib and groove may be separated into spaced halves which also will interlock in the manner of the invention. The essential features of the invention are summarized in the appended claims.

What is claimed is:

1. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the exterior walls only of said portions whereby to bend said grooved portion into open position and to bring said rib progressively into interlocking engagement therewith as the slide member is moved in one direction and to separate the interlocked portions as the slide members move in the opposite direction.

2. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein.

3. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein, comprising an inwardly extending projection in the top wall of said slide member.

4. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite diretcion, said slide member having means to bend said grooved portion about a central longitudinal axis whereby to open the groove and permit the insertion of the rib therein, comprising an inwardly extending projection in the top wall of said slide member, and surfaces in said slide member adapted to engage said grooved portion and to exert a force upon the portion opposite to the force imposed thereon by said projection in said top wall.

5. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein, said slide member having means to bend the rib portion convexly upward to open the longitudinal grooves positioned adjacent the bar of the T.

6. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein, said slide member having means to bend the rib portion convexly upward to open the longitudinal grooves positioned adjacent the bar of the T, comprising an inwardly extending projection in the bottom wall of said slide member.

7. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein, said slide member having means to bend the ribbed portion convexly in the direction of the grooved portion.

8. A fastener of the type described comprising a pair of longitudinal strips adapted to have their marginal portions overlap in face-to-face contact, one of said portions having a continuous longitudinally extending groove, T-shaped in section, and the other of said portions having a continuous longitudinal rib projecting from said portion and having a T-shaped section adapted to fit snugly within said groove in interlocking engagement therewith and a slide member engaging said portions and adapted to slide along the portions and to bring them progressively into interlocking engagement as the slide member is moved in one direction and to separate the portions as the slide members move in the opposite direction, said slide member having means to bend said grooved portion about a central longitudinal axis whereby to open the groove and permit the insertion of the rib therein, said slide member having means to bend the ribbed portion convexly in the direction of the grooved portion, and means to engage the free edge of said ribbed portion to hold it in contact with the bottom wall of the slide member.

9. A fastener of the type described comprising a pair of strips having longitudinal continuous interlocking grooved and ribbed portions, respectively, the groove being characterized by having an interior dimension exceeding width of the mouth of the groove, and a slide member having means to bend the grooved strip about a longitudinal axis by imposing a force centrally of the groove whereby to open up the mouth of the groove to permit the insertion of said ribbed portion.

10. A fastener of the type described comprising a pair of strips having, respectively, longitudinal, continuous interlocking grooved and ribbed portions, the ribbed strip having a single rib having at least two opposed overhanging cantilever portions whose cantilever lengths do not substantially exceed the thickness of said overhanging portions at the roots thereof, the grooved strip having a single groove adapted to receive said rib with a snug fit, and a slide member adapted to engage said strip portions and by movement in one direction bring them into interlocking engagement and by movement in the other direction separate them from said engagement, said slide member having means to bend said grooved strip about a longitudinal central axis.

11. A fastener of the type described comprising a pair of strips having, respectively, longitudinal, continuous interlocking grooved and ribbed portions, the ribbed strip having a single rib having at least two opposed overhanging cantilever portions whose cantilever lengths do not substantially exceed the thickness of said overhanging portions at the roots thereof, the grooved strip having a single groove adapted to receive said rib with a snug fit, and a slide member adapted to engage said strip portions and by movement in one direction bring them into interlocking engagement and by movement in the other direction separate them from said engagement, said slide member having means to bend said grooved strip about a longitudinal central axis, said means comprising cam surfaces engaging the grooved strip centrally of said groove and at spaced points on either side of the mouth of said groove.

12. A fastener of the type described comprising a pair of strips having, respectively, longitudinal, continuous interlocking grooved and ribbed portions, the ribbed strip having a single rib having at least two opposed overhanging cantilever portions whose cantilever lengths do not substantially exceed the thickness of said overhanging portions at the roots thereof, the grooved strip having a single groove adapted to receive said rib with a snug fit, and a slide member adapted to engage said strip portions and by movement in one direction bring them into interlocking engagement and by movement in the other direction separate them from said engagement, said slide member having means to bend said grooved strip about a longitudinal central axis, said means comprising cam surfaces engaging the grooved strip centrally of said groove and at spaced points on either side of the mouth of said groove, and cam surfaces adapted to engage said ribbed strip and bend it convexly upwardly.

GEORGE P. BOSOMWORTH.
STANLEY M. CLARK.

References Cited in the file of this patent

UNITED STATES PATENTS

| Number | Name | Date |
| --- | --- | --- |
| 2,558,367 | Madsen | June 26, 1951 |

FOREIGN PATENTS

| Number | Country | Date |
| --- | --- | --- |
| 200,985 | Switzerland | Mar. 1, 1939 |
| 522,663 | Great Britain | June 24, 1940 |